(12) United States Patent
Watanabe et al.

(10) Patent No.: US 7,708,239 B2
(45) Date of Patent: May 4, 2010

(54) TURNTABLE AND DISPLAY APPARATUS

(75) Inventors: Norihiro Watanabe, Tokyo (JP); Atsushi Michimori, Tokyo (JP); Tetsuji Homma, Tokyo (JP); Masumi Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 11/812,740

(22) Filed: Jun. 21, 2007

(65) Prior Publication Data

US 2008/0006748 A1 Jan. 10, 2008

(30) Foreign Application Priority Data

Jul. 10, 2006 (JP) ............................. 2006-189050

(51) Int. Cl.
*F16M 13/00* (2006.01)
*F16M 11/00* (2006.01)
*F16M 11/06* (2006.01)
*F16M 11/08* (2006.01)
*A47F 5/00* (2006.01)
*A47F 7/00* (2006.01)
*A47B 91/00* (2006.01)
*F16B 7/10* (2006.01)
*F16C 11/00* (2006.01)

(52) U.S. Cl. .............. 248/125.7; 248/186.1; 248/186.2; 248/349.1; 403/112; 403/113

(58) Field of Classification Search .............. 248/128.5, 248/125.7, 150, 371, 923, 122.1, 922, 146, 248/917, 919, 158, 291.1, 133, 186.2, 349.1, 248/415, 125.1, 278, 283.1, 183.2, 231.71, 248/246.04, 178.1, 921, 918, 398, 346.06, 248/289.11, 346.01; 361/681; 403/112, 403/113, 116, 157; 348/749, 790, 836, 838, 348/843, 825; 345/205, 87, 905

See application file for complete search history.

(56) References Cited

U.S. PATENT DOCUMENTS 6,189,842 B1 * 2/2001 Bergeron Gull et al. .. 248/125.1

(Continued)

FOREIGN PATENT DOCUMENTS

JP 54-153221 U 10/1979

(Continued)

*Primary Examiner*—J. Allen Shriver, II
*Assistant Examiner*—Christopher Garft
(74) *Attorney, Agent, or Firm*—Birch, Stewart, Kolasch & Birch, LLP

(57) ABSTRACT

A turntable includes a rotatable member rotatable together with a display portion about a predetermined axis line, a fixed member disposed on one side of the rotatable member in a direction of the axis line, a first friction plate whose rotation about the axis line is restricted by the rotatable member (and movable relative to the rotatable member in a direction of the axis line), and a second friction plate whose rotation about the axis line is restricted by the fixed member (and movable relative to the fixed member in a direction of the axis line). The first friction plate and the second friction plate are disposed between the fixed member and the rotatable member in a direction of the axis line. At least, a sliding contact portion between the fixed member and the first friction plate, a sliding contact portion between the first friction plate and the second friction plate, and a sliding contact portion between the second friction plate and the rotatable member are provided.

19 Claims, 11 Drawing Sheets

U.S. PATENT DOCUMENTS

| | | | |
|---|---|---|---|
| 6,231,020 B1 * | 5/2001 | Willson | 248/349.1 |
| 6,443,408 B1 * | 9/2002 | Hung | 248/176.1 |
| 6,883,206 B2 * | 4/2005 | Yang et al. | 16/337 |
| 2003/0132360 A1 * | 7/2003 | Ju | 248/371 |
| 2005/0051692 A1 * | 3/2005 | Jung et al. | 248/371 |
| 2006/0001782 A1 * | 1/2006 | Kato | 348/794 |

FOREIGN PATENT DOCUMENTS

| | | |
|---|---|---|
| JP | 56-158558 U | 11/1981 |
| JP | 62-71453 U | 5/1987 |
| JP | 1-269746 A | 10/1989 |
| JP | 2002-250335 A | 9/2002 |
| JP | 2002-339948 A | 11/2002 |
| JP | 2004-316794 A | 11/2004 |
| JP | 2005-337484 A | 12/2005 |

* cited by examiner

TURNTABLE AND DISPLAY APPARATUS

BACKGROUND OF THE INVENTION

This invention relates to a turntable of a display apparatus, and particularly relates to a turntable that can be manually rotated.

A display apparatus such as an LCD (Liquid Crystal Display) television uses a turntable to adjust the orientation of a display portion. A conventional turntable includes a base on which the display portion is placed. The base is rotated by a motor via a power transmission mechanism. In order to prevent a finger or the like of a user from being caught between the display portion and its surrounding object, the power transmission from the motor to the base is disconnected under given conditions.

To be more specific, a first rotation-transmission body linked to the motor and a second rotation-transmission body for rotating the base are coaxially mounted on the same rotation shaft. The rotation of the motor is transmitted to the base due to the friction force between the first and second rotation-transmission bodies. When the external force is applied to the display portion, the first and second rotation-transmission bodies slide on each other, and the power of the motor is not transmitted to the base.

Further, in order to adjust the friction force between the first and second rotation-transmission bodies, it is proposed to provide a clutch nut that can be tightened and loosened to adjust the urging force with which the second rotation-transmission body is urged against the first rotation-transmission body. Such a turntable is disclosed in, for example, Japanese Laid-Open Patent Publication No. 2004-316794 (Page 5 and FIG. 1).

In the above described conventional turntable, the first rotation-transmission body has an insertion shaft on which the second rotation-transmission body is rotatably supported. An external thread formed on the circumference of the insertion shaft engages an internal thread formed on the clutch nut. By tightening the clutch nut on the insertion shaft, the second rotation-transmission body is sandwiched between the first rotation-transmission body and the clutch nut. By adjusting the tightening amount of the clutch nut, the urging force with which the second rotation-transmission body is urged against the first rotation-transmission body can be adjusted, so that the friction force between the first and second rotation-transmission bodies can be adjusted.

However, the first and second rotation-transmission bodies and the clutch nut are made of resin, and therefore the above described urging force is subject to the changes of shapes of the respective members with time, due to the creep deformation. Further, the changing rate of the urging force to the resilient deformation of the respective members (i.e., a spring coefficient) is large, and therefore the urging force may largely change even when the changes of shapes are small.

In order to reduce the influence of the changes of shapes of the respective members with time, it can be considered to urge the second rotation-transmission body against the first rotation-transmission body using an urging member whose spring constant changes by a small amount. However, in such a case, due to the provision of the urging member, the number of the components increases, and the turntable becomes large.

Moreover, the turntable of the above described publication has scale marks formed on the second rotation-transmission body, for facilitating the adjustment of the clutch nut. The scale marks are formed on the surface of the second rotation-transmission body on the clutch nut side, and indicate a rotation angle of the clutch nut. However, the adjustment of the clutch nut needs to be performed overcoming the above described friction force, and therefore it is not easy to adjust the clutch nut in alignment with the scale marks. Further, since the spring coefficient is large as described above, there may be the case where the urging force largely varies.

Furthermore, it is also possible to manually operate (rotate) the display portion, causing the first and second rotation-transmission bodies to slide on each other. However, if there is a variation in the urging force with which the second rotation-transmission body is urged against the first rotation-transmission body, there may be the case where the rotational resistance (friction) when the display portion is rotated is too large, or there may be the case where the rotational resistance is so small that the rotational position of the display portion is not stabilized. Therefore, it is demanded to accomplish a stable rotating operation whose variation (including change with time) is small.

Additionally, as the LCD television or the like becomes thin, it is demanded to miniaturize the turntable. In this regard, when the user manually adjusts the orientation of the display portion, the user pushes the end portion of the display portion by hand. In the display apparatus with a large-sized screen, the distance between the rotation axis of the display portion and the point of application of the force becomes longer. Therefore, in order to stabilize the rotational position of the display portion and to obtain an appropriate operational feeling, it is necessary to obtain a large rotational resistance to some extent while miniaturizing the turntable.

SUMMARY OF THE INVENTION

The present invention is intended to solve the above described problems, and an object of the present invention is to provide a turntable enabling a stable manual rotation (operation) of the display portion, and enabling miniaturization.

The present invention provides a turntable including a rotatable member rotatable together with a display portion about a predetermined axis line, a fixed member disposed on one side of the rotatable member in a direction of the axis line, a first friction plate whose rotation about the axis line is restricted by the rotatable member, the first friction plate being movable relative to the rotatable member in a direction of the axis line, and a second friction plate whose rotation about the axis line is restricted by the fixed member, the second friction plate being movable relative to the fixed member in a direction of the axis line. The first friction plate and the second friction plate are disposed between the fixed member and the rotatable member in a direction of the axis line. At least, a sliding contact portion between the fixed member and the first friction plate, a sliding contact portion between the first friction plate and the second friction plate, and a sliding contact portion between the second friction plate and the rotatable member are provided.

With such an arrangement, friction forces can be obtained at the sliding contact portion between the fixed member and the first friction plate, the sliding contact portion between the first friction plate and the second friction plate, and the sliding contact portion between the second friction plate and the rotatable member. Therefore, it becomes possible to generate a stable friction force which is less influenced by the change of shapes of the respective members. As a result, it becomes possible to reduce the variation in the rotational resistance when the user manually rotates the display portion, and the rotating operation becomes stable.

Furthermore, with the configuration in which the weight of the display portion is applied to the respective sliding contact portions, it becomes unnecessary to provide a separate urging mechanism. As a result, the configuration of the turntable becomes simple, and the weight of the turntable decreases. Further, by adjusting the weight of the display portion, the friction force (i.e., the rotational resistance) can be adjusted in a simple manner.

DETAILED DESCRIPTION OF THE PREFERRED EMBODIMENT

Embodiments of the present invention will be described with reference to the attached drawings.

Embodiment 1

Figure 1:
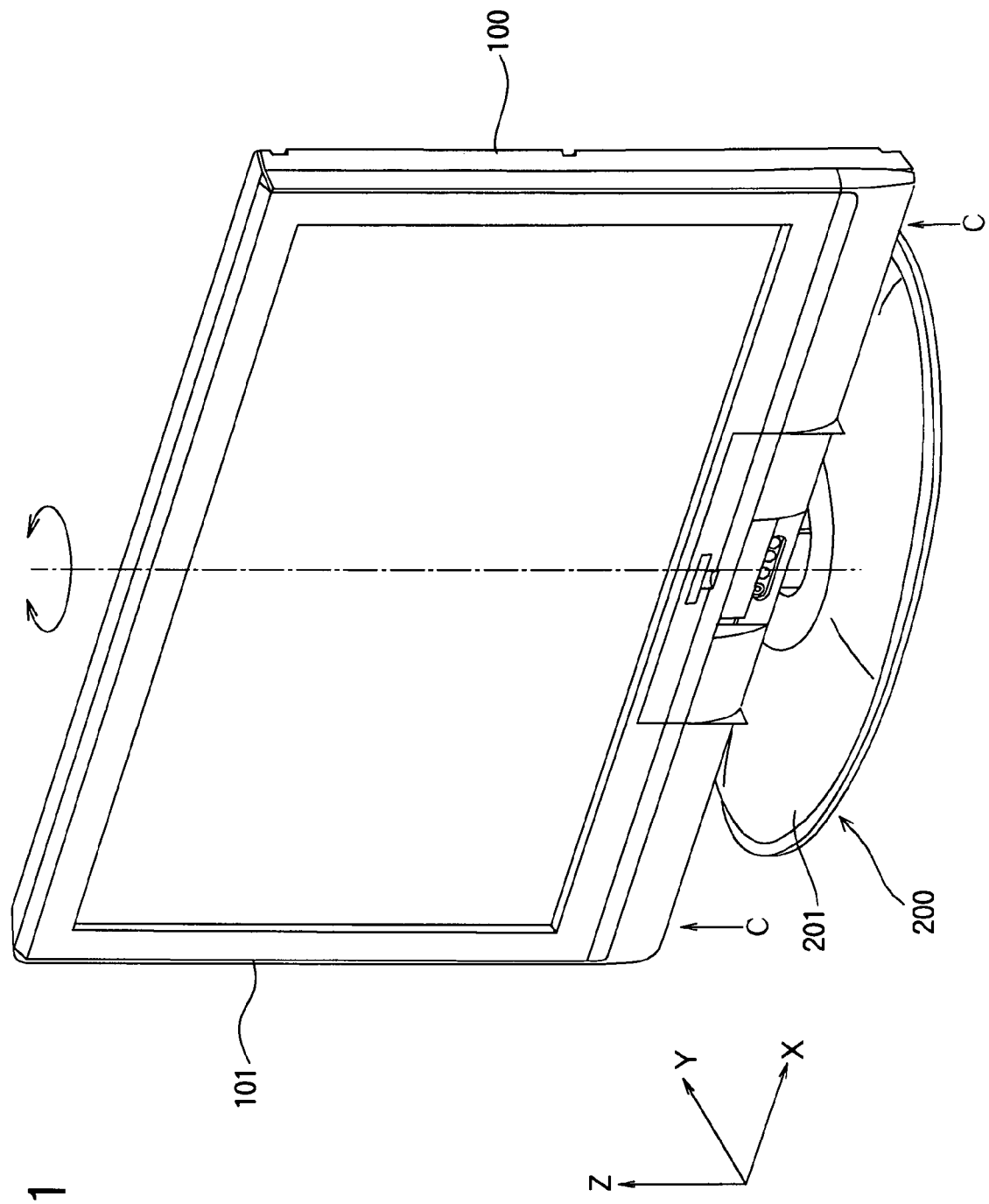
FIG. 1 is a perspective view showing an external shape of a display apparatus including a turntable according to Embodiment 1 of the present invention.

FIG. 1 is a perspective view showing the external shape of a display apparatus according to Embodiment 1 of the present invention. The display apparatus includes a display portion 100 having a display screen 101 for displaying an image or the like, and a turntable 200 on which the display portion 100 is mounted. The display portion 100 is, for example, an LCD television. The turntable 200 supports the display portion 100 so that the display portion 100 is rotatable about a vertical rotation axis (as an axis line) defined as Z-axis. By rotating the display portion 100, the display screen 101 can be oriented toward a user (viewer). The rotation axis is defined at, for example, a center position of the display screen 101 in the horizontal direction. A plane perpendicular to the Z-axis is defined as XY-plane.

Figure 2:
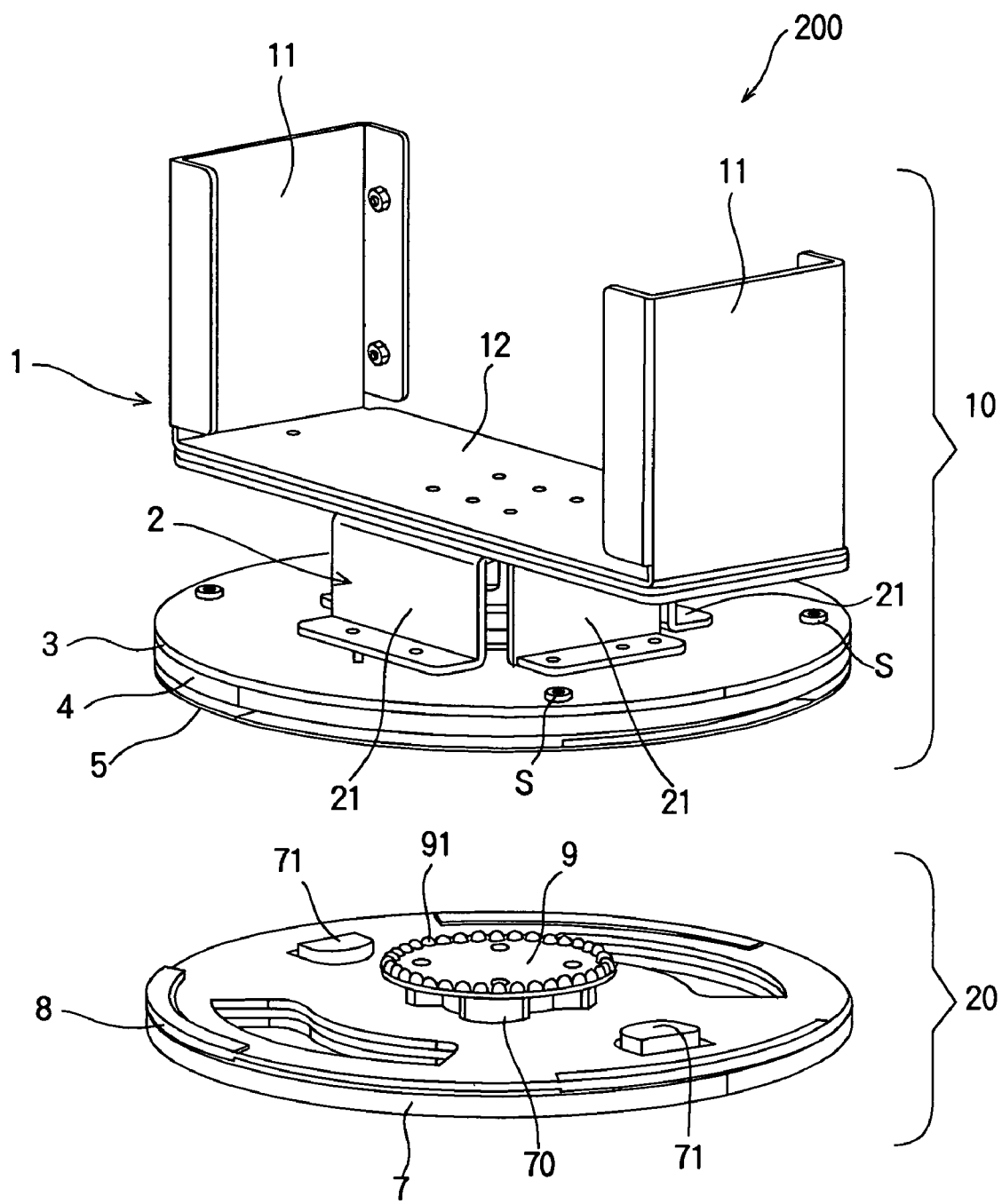
FIG. 2 is a perspective view showing the turntable according to Embodiment 1 in such a manner that the turntable is divided into a rotatable unit and a fixed unit.
Figure 3:
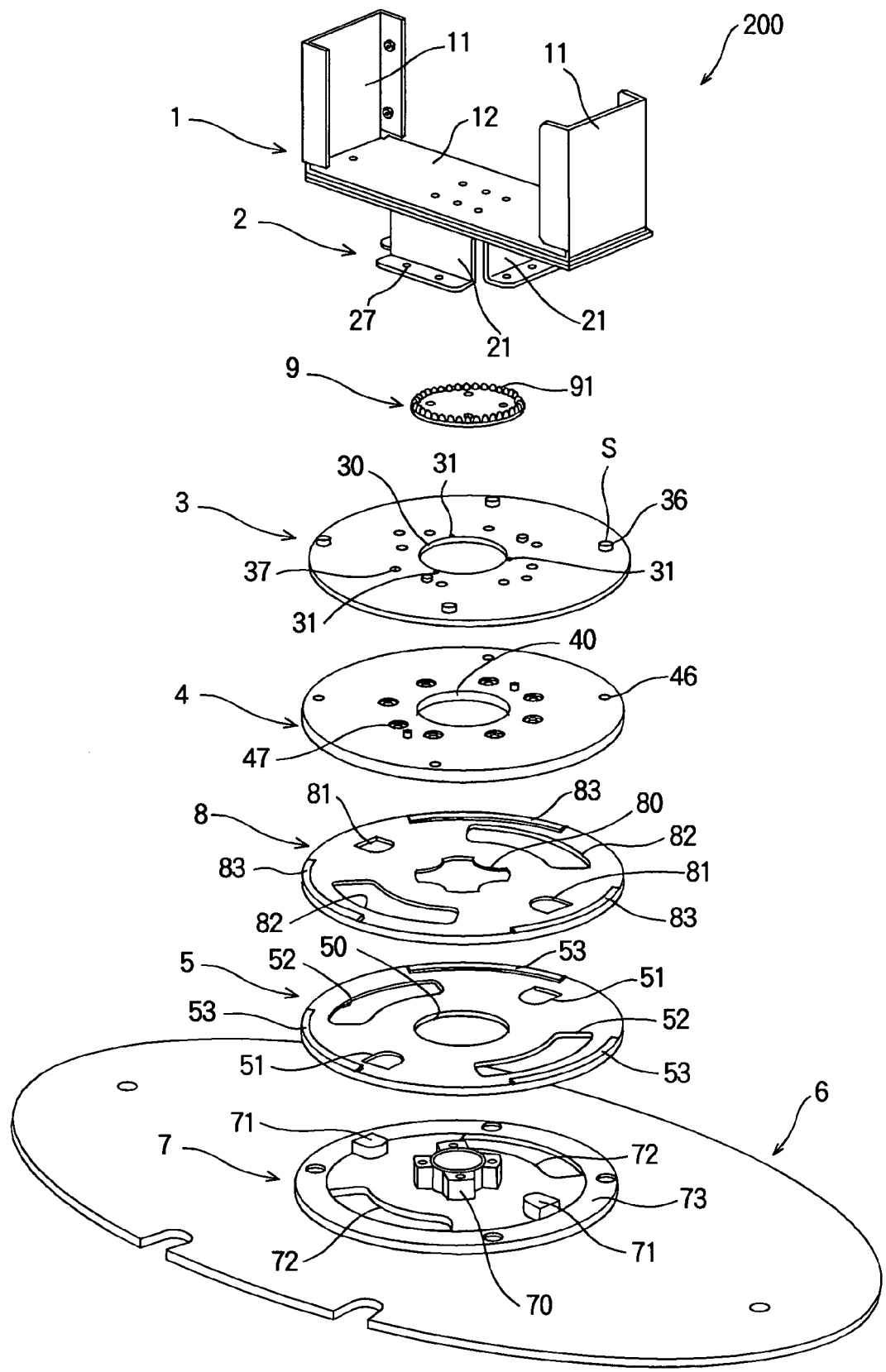
FIG. 3 is an exploded perspective view showing the configuration of the turntable according to Embodiment 1.
Figure 4:
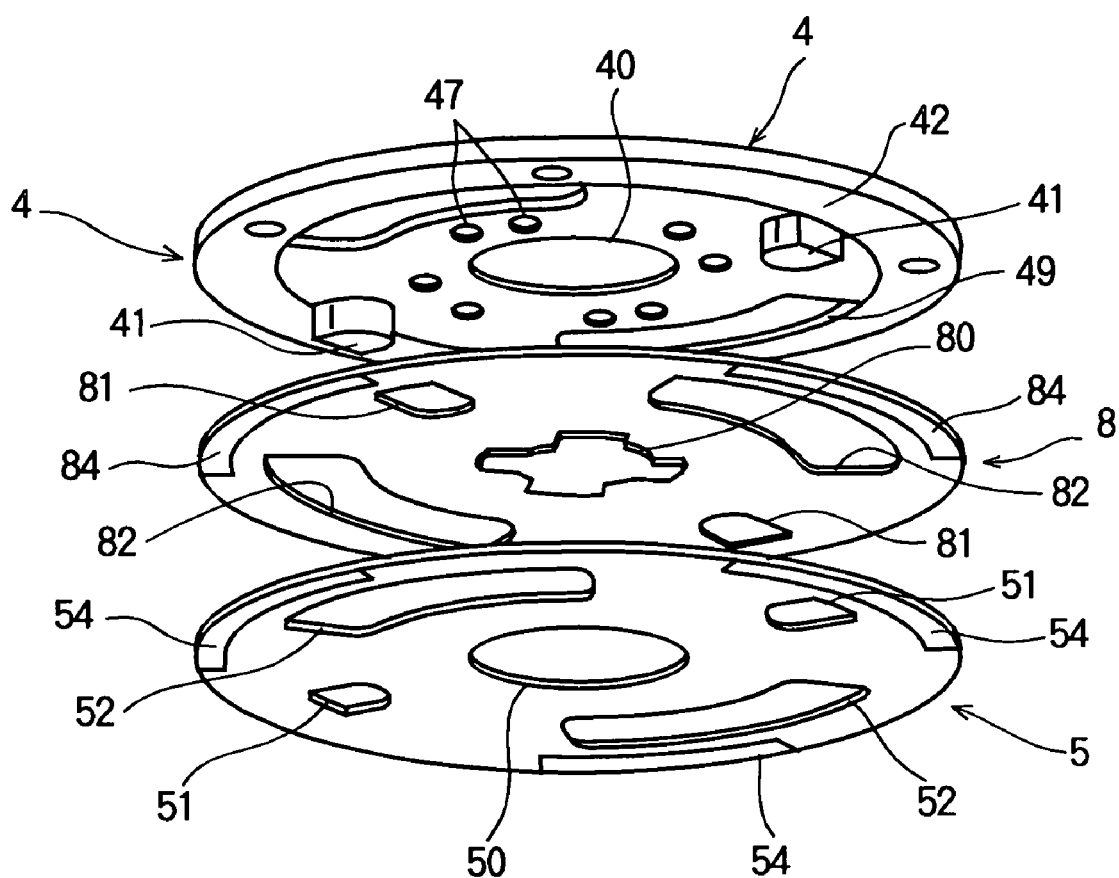
FIG. 4 is a perspective view showing a rotatable plate and respective friction plates of the turntable according to Embodiment 1.

FIG. 2 is a perspective view showing the internal configuration of the turntable 200 in such a manner that the turntable 200 is divided into a rotatable unit and a fixed unit. FIG. 3 is an exploded perspective view showing the internal configuration of the turntable 200. FIG. 4 is an exploded perspective view showing a part of the turntable 200 in an enlarged manner. As shown in FIG. 2, the turntable 200 includes a rotatable unit 10 that rotates together with the display portion 100 (FIG. 1) and a fixed unit (i.e., a stand) 20 that rotatably supports the rotatable unit 10. The rotatable unit 10 and the fixed unit 20 are housed in an external cover 201 (FIG. 1).

As shown in FIG. 3, the turntable 200 includes a mounting base 1 (of substantially U-shape) to which the display portion 100 is mounted, a neck base 2 that supports the mounting base 1 from below, a rotatable base 3 fixed to the lower side of the neck base 2, a rotatable plate (i.e., a rotatable member) 4 fixed to the lower side of the rotatable base 3, a fixed plate (i.e., a fixed member) 7 that rotatably supports the rotatable plate 4, and a bottom plate 4 that defines a bottom of the entire body of the turntable 2.

Between the rotatable plate 4 and the fixed plate 7, a first friction plate 5 and a second friction plate 8 are disposed in this order from the fixed plate 7 side. A retaining plate (for example, a metal plate) 9 is fixed to the fixed plate 7, for holding the rotatable base 3, the rotatable plate 4 and the first and second friction plates 5 and 8 so that the respective members are not dropped out of the fixed plate 7.

The mounting base 1, the neck base 2, the rotatable base 3, the rotatable plate 4 and the first friction plate 5 constitute a rotatable unit 10 (FIG. 2) that rotates together with the display portion 100. The bottom base 6, the fixed plate 7, the second friction plate 8 and the retaining plate 9 constitute a fixed unit 20 (FIG. 2) that does not rotate.

As shown in FIG. 3, the mounting base 1 includes a pair of vertical plates 11 that engage predetermined portions of the display portion 100 and a bottom plate 12 that connects both lower ends of the vertical plates 11. The neck base 2 includes a top plate 22 (FIG. 5) fixed to the bottom plate 12 of the mounting base 1 and four side plates 21 downwardly bent from four sides of the top plate 22.

The rotatable base 3 is a disk-shaped member. The bottom ends of the side plates 21 of the neck base 2 are fixed to the upper surface of the rotatable base 3. A circular opening 30 is formed on the center portion of the rotatable base 3. Three protrusions 31 are formed on the circumference of the opening 30, and protrude upward (i.e., to the mounting base 1 side).

The rotatable plate 4 is a disk-shaped member whose diameter is substantially the same as the rotatable base 3. A circular opening 40 is formed on the center portion of the rotatable plate 4. As shown in FIG. 4, a sliding contact surface 42 is formed on the lower surface of the periphery of the rotatable plate 4, and slidably contacts the second friction plate 8. A pair of convexes 41 are formed on the lower surface of the rotatable plate 4, which will be described later.

The mounting base 1, the neck base 2, the rotatable base 3 and the rotatable plate 4 are integrally fixed to each other by means of screws. For example, screws S (FIG. 2) penetrate through holes 36 (FIG. 3) formed in the vicinity of the periphery of the rotatable base 3, and engage threaded holes 46 formed in the vicinity of the periphery of the rotatable plate 4, so that the rotatable base 3 and the rotatable 4 are fixed to each other. Further, not shown screws penetrate through holes 37 formed on the circumference of the opening 30 of the rotatable base 3 (via holes 47 formed on the circumference of the opening 40 of the rotatable plate 4), and engage threaded holes 27 formed on the lower end portions of the side plates 21 of the neck base 2, so that the neck base 2 and the rotatable base 3 are fixed to each other.

The second friction plate 8 is a disk-shaped member whose diameter is substantially the same as the rotatable plate 4. An opening 80 substantially in the shape of a cross is formed on the center portion of the second friction plate 8. A center shaft 70 (having substantially cross-shaped section as described later) of the fixed plate 7 engages the opening 80 of the second friction plate 8. Sliding contact surfaces 83 (FIG. 3) are formed on the upper side of the periphery of the second friction plate 8, and slidably contact the rotatable plate 4. Sliding contact surfaces 84 (FIG. 4) are formed on the lower side of the periphery of the second friction plate 8, and slidably contact the first friction plate 5. The sliding contact surfaces 83 and 84 are disposed three by three at constant intervals in the circumferential direction of the second friction plate 8.

The first friction plate 5 is a disk-shaped member whose diameter is substantially the same as the second friction plate 8. A circular opening 50 is formed on the center portion of the first friction plate 5. Sliding contact surfaces 53 (FIG. 3) are formed on the upper side of the periphery of the first friction plate 5, and slidably contact the second friction plate 8. Sliding contact surfaces 54 (FIG. 4) are formed on the lower side of the periphery of the first friction plate 5, and slidably contacts the fixed plate 7. The sliding contact surfaces 53 and 54 are disposed three by three at constant intervals in the circumferential direction of the first friction plate 5.

The fixed plate 7 is a disk-shaped member whose diameter is substantially the same as the second friction plate 8. Sliding contact surfaces 73 are formed on the upper side of the periphery of the fixed plate 7, and slidably contact the first friction plate 5. The fixed plate 7 includes the center shaft 70 extending in the Z-direction and penetrating through the openings 30, 40, 50 and 80 of the rotatable base 3, the rotatable plate 4, the friction plates 5 and 8. The center shaft 70 has a section substantially in the shape of a cross in the XY-plane, and outermost end surfaces of the center shaft 70 constitute parts of a cylindrical surface having a center axis in the Z-direction. A pair of convexes 71 are formed on the upper surface of the fixed plate 7, which will be described later.

The first friction plate 5, the second friction plate 8, the rotatable plate 4 and the rotatable base 3 are supported about the center shaft 70 of the fixed plate 7 in this order from below. The retaining plate 9 is fixed to the upper end (i.e., the end on the mounting base 1 side) of the center shaft 70 of the fixed plate 7. The first friction plate 5, the second friction plate 8, the rotatable plate 4 and the rotatable base 3 are supported between the fixed plate 7 and the retaining plate 9. In this state, respective plates (i.e., the first friction plate 5, the second friction plate 8, the rotatable plate 4 and the rotatable base 3) are movable in the Z-direction by predetermined amount. Further, the first friction plate 5, the rotatable plate 4 and the rotatable base 3 are rotatable about the rotation axis of the Z-axis (while the rotation of the second friction plate 8 is restricted by the fixed plate 7).

The retaining plate 9 is a disk-shaped member. Three concaves 91 are formed on the periphery of the retaining plate 9 by means of embossing so that the concaves 91 are concave downward. The concaves 91 are engageable with three protrusions 31 formed on the rotatable base 3 as described later.

Next, the configuration for supporting the first friction plate 5 and the second friction plate 8 between the rotatable plate 4 and the fixed plate 7 will be described. As shown in FIG. 4, the first friction plate 5 has two holes 51 substantially in the shape of semicircles at two symmetrical positions with respective to the center of the first friction plate 5. The holes 51 engage two convexes 41 having semicircular sections formed on the bottom surface of the rotatable plate 4. By the engagement between the convexes 41 and the holes 51, the first friction plate 5 and the rotatable plate 4 are fixed to each other in the rotational direction in such a manner that the first friction plate 5 and the rotatable plate 4 are relatively slidable in the Z-direction. Arc-shaped grooves (i.e., through holes) 82 are formed on the second friction plate 8 (between the first friction plate 5 and the rotatable plate 4) so that the convexes 41 of the rotatable plate 4 penetrate through the arc-shape grooves 82. Further, grooves 72 are formed on the fixed plate 7, for providing escape zones for the convexes 41 of the rotatable plate 4.

The second friction plate 8 has two holes 81 substantially in the shape of semicircles at two symmetrical positions with respect to the center of the second friction plate 8. The holes 81 engage two convexes 71 (FIG. 3) having semicircular sections formed on the upper surface of the fixed plate 7. By the engagement between the convexes 71 and the holes 81, the second friction plate 8 and the fixed plate 7 are fixed to each other in the rotational direction in such a manner that the second friction plate 8 and the fixed plate 7 are relatively slidable in the Z-direction. Arc-shaped grooves (through holes) 52 are formed on the first friction plate 5 (between the second friction plate 8 and the fixed plate 7) so that the convexes 71 of the fixed plate 7 penetrate the arc-shape grooves 52. Further, grooves 49 (FIG. 4) are formed on the rotatable plate 4, for providing escape zones for the convexes 71 of the fixed plate 7.

Figure 5:
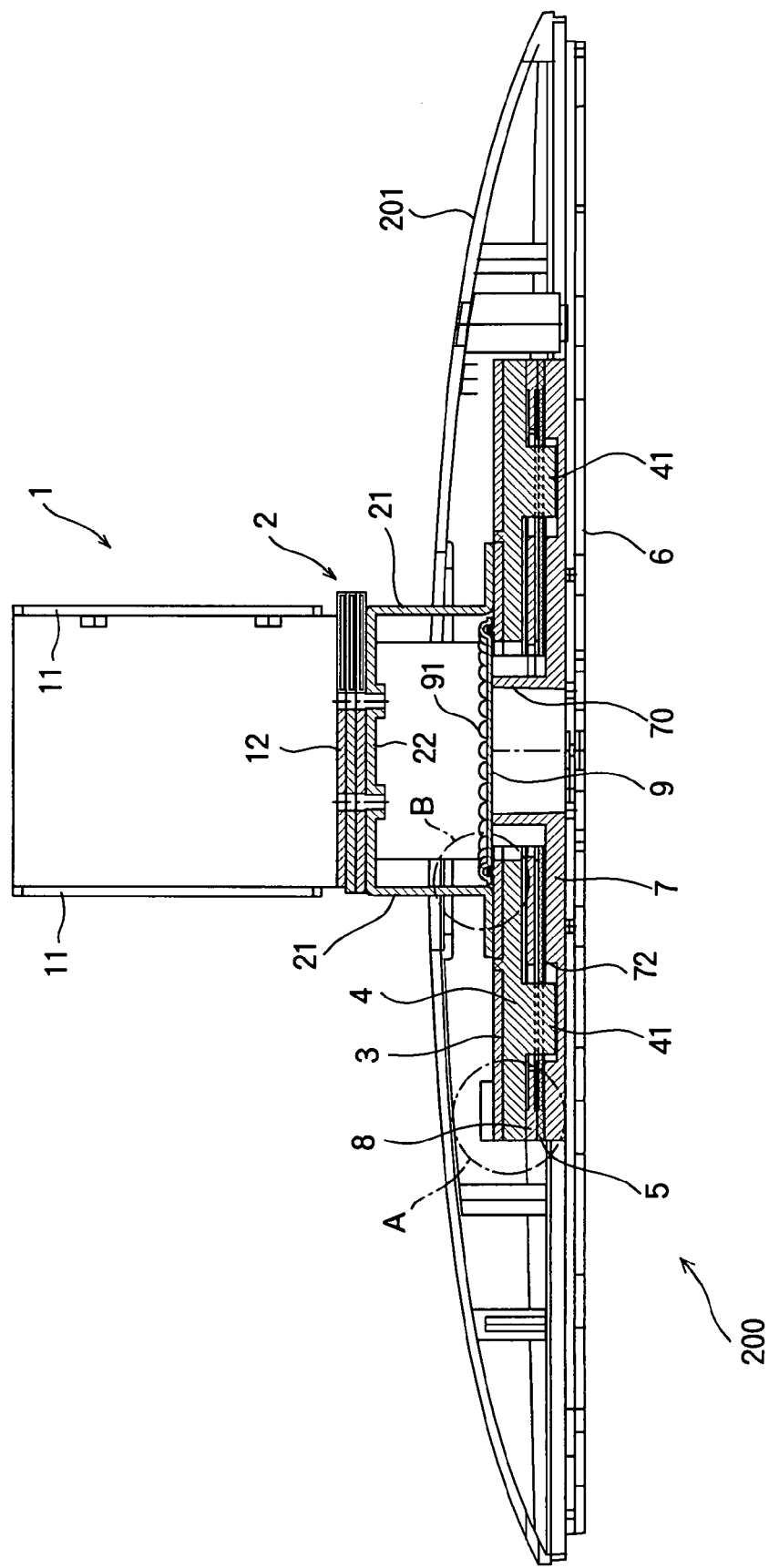
FIG. 5 is a sectional view showing the turntable according to Embodiment 1 taken along the Y-Z plane including a rotation axis.
Figure 6:
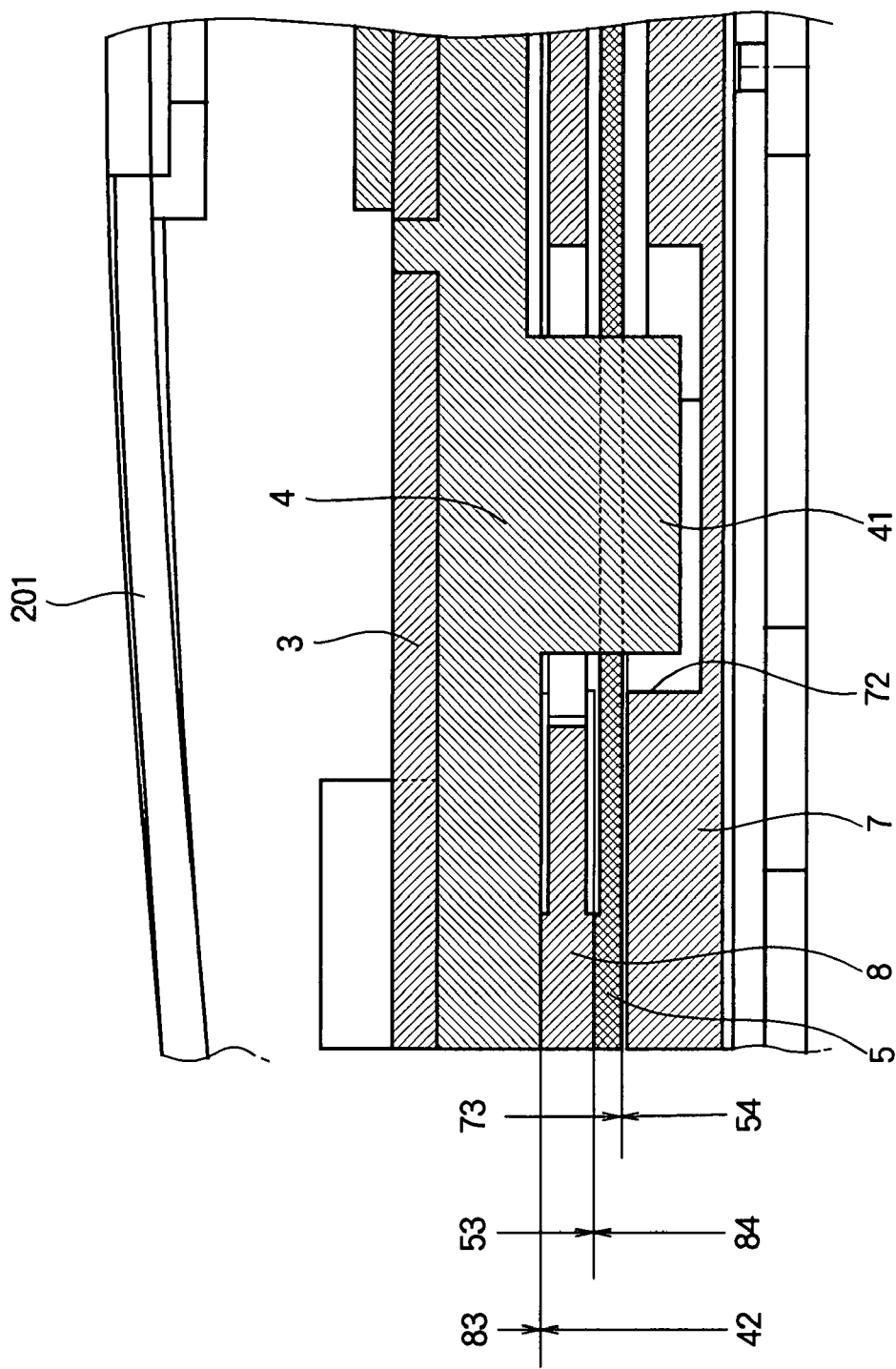
FIG. 6 is an enlarged sectional view showing a part of the turntable encircled by a circle A shown in FIG. 5.

FIG. 5 is a sectional view of the turntable 200 cut along the YZ-plane including the rotation axis. FIG. 6 is an enlarged sectional view showing the part encircled by a circle A in FIG. 5. As shown in FIG. 5, the fixed plate 7, the first friction plate 5, the second friction plate 8, the rotatable plate 4, the rotatable base 3, the neck base 2 and the mounting base 1 are overlapped in this order on the bottom base 6. Therefore, the weight of the display portion 100 is applied to the base 6 via the mounting base 1, the neck base 2, the rotatable base 3, the rotatable plate 4, the second friction plate 8, the first friction plate 5 and the fixed plate 7.

In other words, as shown in FIG. 6, the weight of the display portion 100 is applied to a sliding contact portion between the sliding contact surfaces 42 of the rotatable plate 4 and the sliding contact surfaces 83 of the second friction plate 8, a sliding contact portion between the sliding contact surfaces 84 of the second friction plate 8 and the sliding contact surfaces 53 of the first friction plate 5, and a sliding contact portion between the sliding contact surfaces 54 of the first friction plate 5 and the sliding contact surfaces 73 of the fixing plate 7. Therefore, the respective sliding contact surfaces are urged against each other, so that the friction forces are generated.

Next, the description will be made to the case where the user manually rotates the display portion 100 by, for example, pushing or pulling the left end portion or the right end portion of the display portion 100. According to the rotation of the display portion 100, the mounting base 1 (to which the display portion 100 is fixed), the neck base 2, the rotatable base 3 and the rotatable plate 4 also rotate. The rotation of the first friction plate 5 relative to the rotatable plate 4 is restricted by the engagement between the holes 51 and the convexes 41, and therefore the first friction plate 5 rotates together with the rotatable plate 4. The fixed plate 7 and the retaining plate 9 are fixed to the bottom base 6, and therefore do not rotate. The rotation of the second friction plate 8 relative to the fixed plate 7 is fixed by the engagement between the holes 81 and the convexes 71, and therefore the second friction plate 8 does not rotate.

As a result, the sliding contact surfaces 73 (FIG. 3) of the fixed plate 7 and the sliding contact surfaces 54 (FIG. 4) of the first friction plate 5 slide on each other and rotate relative to each other. The sliding contact portion between the sliding contact surfaces 73 and 54 is referred to as a first sliding contact portion. Further, the sliding contact surfaces 53 (FIG.

3) of the first friction plate 5 and the sliding contact surfaces 84 (FIG. 4) of the second friction plate 8 slide on each other and rotate relative to each other. The sliding contact portion between the sliding contact surfaces 53 and 84 is referred to as a second sliding contact portion. The sliding contact surfaces 83 (FIG. 3) of the second friction plate 8 and the sliding contact surfaces 42 (FIG. 4) of the rotatable plate 4 slide on each other and rotate relative to each other. The sliding contact portion between the sliding contact surfaces 83 and 42 is referred to as a third sliding contact portion.

As the friction forces are generated at the above described first, second and third sliding contact portions by the application of the weight of the display portion 100, a sufficient rotatable resistance is generated when the user rotates the display portion 100. Since the friction forces are generated at a plurality of sliding contact portions arranged in the direction of the rotation axis, it becomes possible to obtain a stable friction force which is less influenced by the change of shapes of the respective components or the like. Further, since the weight of the display portion 100 is applied to the respective sliding contact portions, it becomes possible to reduce the variation (for example, change with time) in the urging force. Furthermore, the friction force can be adjusted in a simple manner by adjusting the surface roughness (i.e., friction coefficient) of the respective sliding contact surfaces or the weight of the display portion 100.

Figure 7:
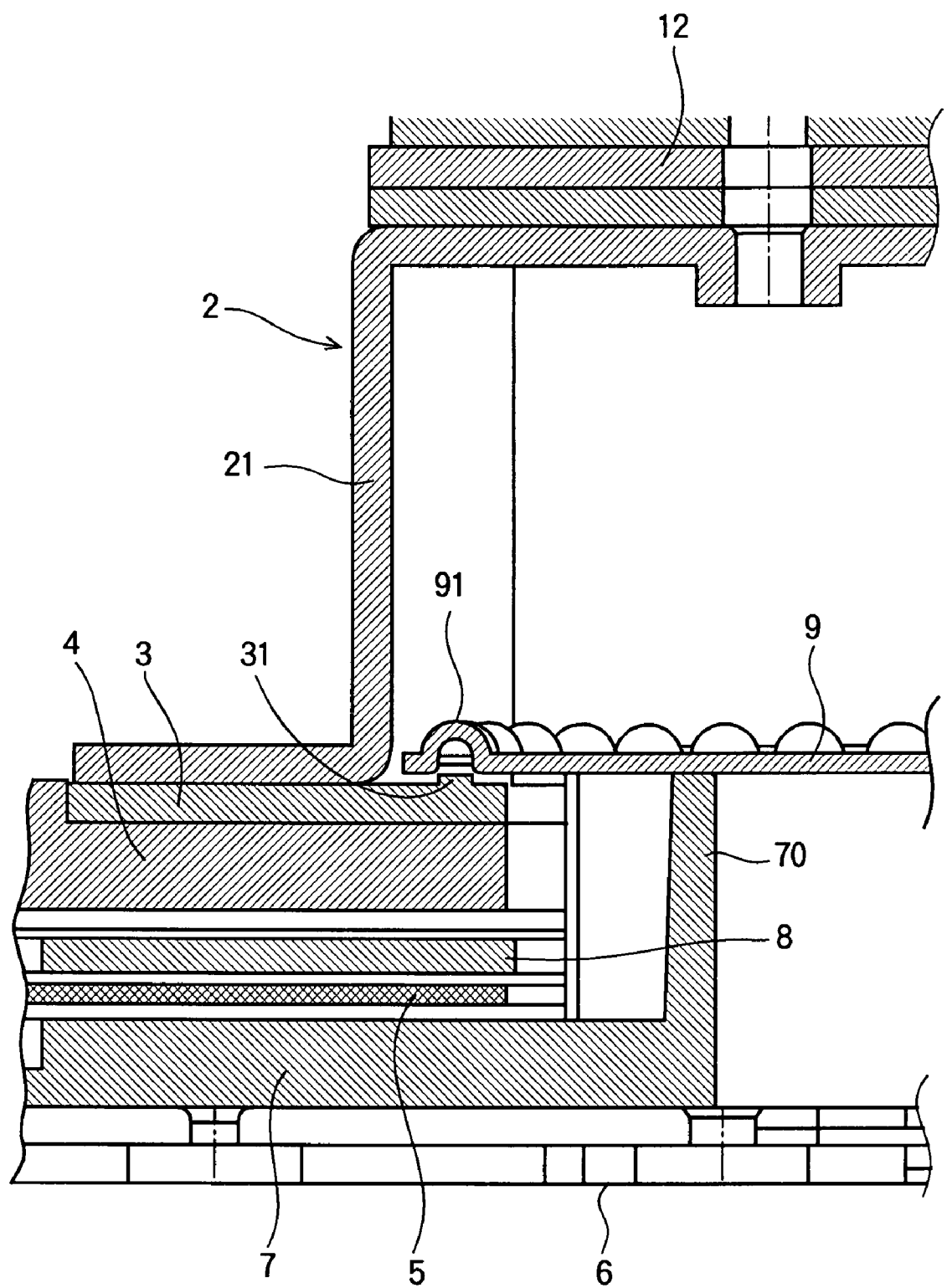
FIG. 7 is an enlarged sectional view showing a part of the turntable encircled by a circle B shown in FIG. 5.
Figure 8:
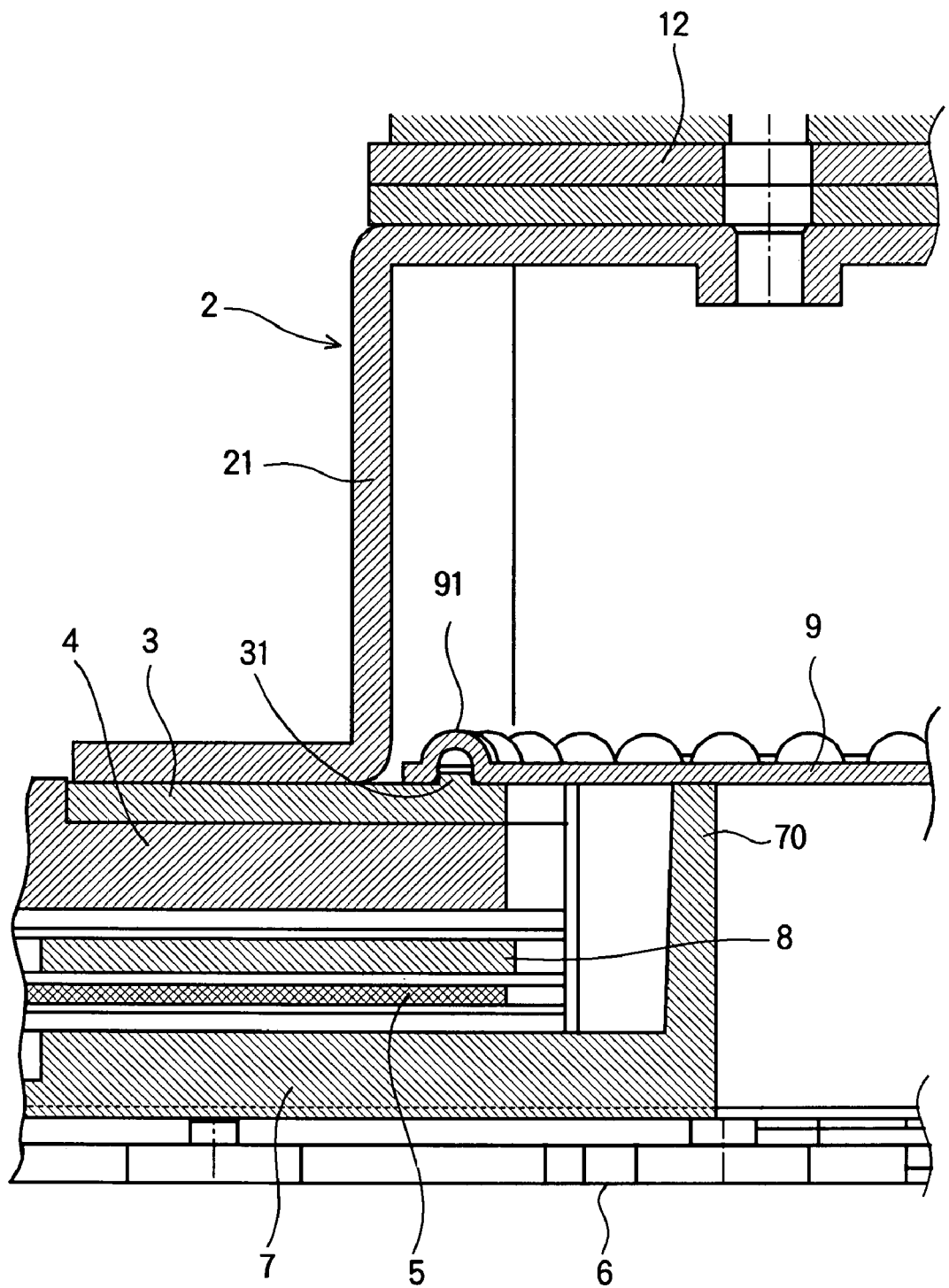
FIG. 8 is an enlarged sectional view showing a part of the turntable encircled by a circle B shown in FIG. 5.

Next, as shown in FIGS. 7 and 8, the configuration for locking the rotation of the turntable 200 relative to the display portion 100 will be described. When the user carries the display apparatus, the user may hold the lower part of the display portion 100. In this state, the turntable 200 is lighter than the display portion 100, and therefore the turntable 200 tends to rotate with a light force during the carriage. Therefore, when the user carries the display apparatus, it is necessary to prevent the turntable 200 from rotating so as to prevent the turntable 200 from hitting the user.

FIGS. 7 and 8 are enlarged sectional views of the part of the turntable encircled by the circle B in FIG. 5. FIG. 7 shows the state where the display apparatus is placed on a setting place. FIG. 8 shows the state where the display apparatus is carried by the user. As described above, the first friction plate 5, the second friction plate 8, the rotatable plate 4 and the rotatable base 3 are supported about the center shaft 70 of the fixed plate 7 in this order, and a predetermined gap is formed between the rotatable base 3 and the retaining plate 9. Therefore, as shown in FIG. 7, in a state where the display apparatus is placed on the setting place, the retaining plate 9 and the rotatable base 3 do not contact each other, so that the user can manually rotates the display portion 100.

In contrast, when the user carries the display apparatus, it is assumed that the user holds both ends (indicated by the mark C in FIG. 1) of the bottom of the display portion 100. In this case, due to the weight of the fixed unit 20, the fixed unit 20 (FIG. 2) shifts downward with respect to the rotatable base 3 (FIG. 2) fixed to the display portion 100. Therefore, the retaining plate 9 relatively shifts downward to contact the rotatable base 3 as shown in FIG. 8.

Therefore, even if the turntable 200 (to be more specific, the fixed unit 20) is going to rotate relative to the display portion 100 while the user carries the display apparatus, the concaves 91 of the retaining plate 9 engage the protrusions 31 of the rotatable base 3 due to the weight of the fixed unit 20, and further rotation of the turntable 200 is prevented. Since the rotation of the turntable 200 is prevented by the engagement between the concaves 91 and the protrusions 31, the rotational position of the turntable 200 is stabilized, and the turntable 200 is prevented from hitting the user.

As described above, according to Embodiment 1 of the present invention, the first friction plate 5 (whose rotation is restricted by the rotatable plate 4) and the second friction plate 8 (whose rotation is restricted by the fixed plate 7) are disposed between the fixed plate 7 fixed to the bottom base 6 and the rotatable plate 4 that rotates together with the display portion 100. Therefore, the friction forces can be generated at three portions, i.e., the first sliding contact portion (between the fixed plate 7 and the first friction plate 5), the second sliding contact portion (between the first and second friction plates 5 and 8), and the third sliding contact portion (between the second friction plate 8 and the rotatable plate 4). Therefore, it becomes possible to obtain a stable friction force which is less influenced by the change of shapes of the respective components or the like. As a result, it becomes possible to reduce the variation in the rotational resistance when the user manually rotates the display portion 100, and therefore it becomes possible to accomplish a stable operation which is less subject to the change with time.

Further, in Embodiment 1, the weight of the display portion 100 is applied to the first to third sliding contact portions, and therefore it becomes possible to reduce the variation (including the change with time) in the urging force. Furthermore, it is not necessary to provide a separate urging unit for generating the friction force, and therefore the configuration of the turntable 200 can be simplified, with the result that the turntable 200 can be miniaturized. Moreover, the friction force at the first to third sliding contact portions can be adjusted by adjusting the weight of the display portion 100, and therefore it becomes possible to adjust the rotational resistance as needed.

Additionally, in Embodiment 1, the concaves 91 of the retaining plate 9 and the protrusions 31 of the rotatable base 3 engage each other at the predetermined rotational positions, and therefore the rotation of the turntable 200 can be locked by the engagement between the concaves 91 and the protrusions 31 when the user carries the display apparatus. Therefore, the safety of the carriage can be enhanced.

In addition, the first friction plate 5 has the holes 51 that engage the convexes 41 of the rotatable plate 4, and the second friction plate 8 has the grooves 82 through which the convexes 41 penetrate. Therefore, it becomes possible to accomplish the configuration where the rotation of the first friction plate 5 with respect to the rotatable plate 4 is restricted, and where the second friction plate 8 is disposed between the rotatable plate 4 and the first friction plate 5. At the same time, the second friction plate 8 has the holes 81 that engage the convexes 71 of the fixed plate 7, and the first friction plate 5 has the grooves 52 through which the convexes 71 of the fixed plate 7 penetrate. Therefore, it becomes possible to accomplish the configuration where the rotation of the second friction plate 8 with respect to the fixed plate 7 is restricted, and where the first friction plate 5 is disposed between the fixed plate 7 and the second friction plate 8.

Embodiment 2

In the above described Embodiment 1, the turntable 200 has one first friction plate 5 and one second friction plate 8. However, it is also possible to provide a plurality of the first friction plates and a plurality of the second friction plates. By changing the number of the first and second friction plates, the friction force (the rotational resistance) can be adjusted.

Figure 9:
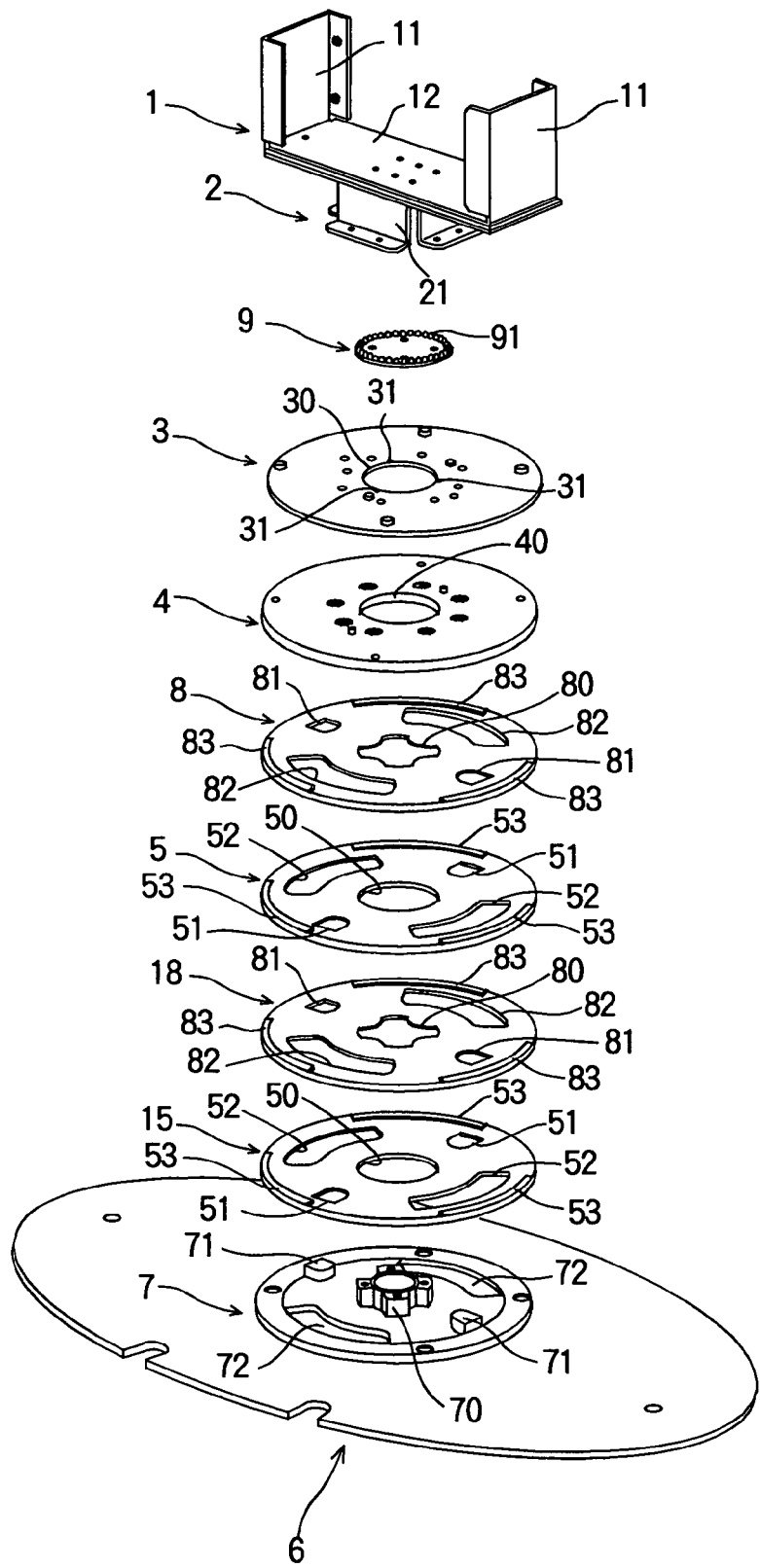
FIG. 9 is an exploded perspective view showing the configuration of a turntable according to Embodiment 2 of the present invention.

FIG. 9 is a schematic view showing a configuration example having another pair of a first friction plate 15 and a second friction plate 18, in addition to the first friction plate 5 and the second friction plate 8. In FIG. 9, components that are the same as those having been described in Embodiment 1 are assigned the same reference numerals.

In the configuration example shown in FIG. 9, the first friction plate 15, the second friction plate 18, the first friction plate 5, the second friction plate 8 are disposed between the fixed plate 7 and the rotatable plate 4 in this order from the fixed plate 7 side. The first friction plates 5 and 15 rotate together with the rotatable plate 4. The rotations of the second friction plates 8 and 18 relative to the fixed plate 7 are restricted. The other configuration is the same as those of Embodiment 1.

In the configuration example shown in FIG. 9, the friction forces are generated at five portions, i.e., the first sliding contact portion (between the fixed plate 7 and the first friction plate 15), the second sliding contact portion (between the first friction plate 15 and the second friction plate 18), the third sliding contact portion (between the second friction plate 18 and the first friction plate 5), the fourth sliding contact portion (between the first friction plate 5 and the second friction plate 8) and the fifth sliding contact portion (between the second friction plate 8 and the rotatable plate 4). Since the number of sliding contact portions increases, a further stable rotational resistance can be obtained, and the stable operation can be accomplished. The number of either of the first friction plates and the second friction plates can be three or more.

As described above, irrespective of the number of the first and second friction plates, the stable rotational resistance with a small variation can be obtained, and the stable operation can be accomplished. Further, by adjusting the number of the first and second friction plates, the friction force (the rotational resistance) can be adjusted as needed.

Embodiment 3

In the above described Embodiment 1, the concaves 91 are formed on the retaining plate 9, and the protrusions 31 (engaging the concaves 91) are formed on the rotatable base 3. However, it is possible to provide the concaves on the rotatable base 3 and to provide the protrusions on the retaining plate 9.

Figure 10:
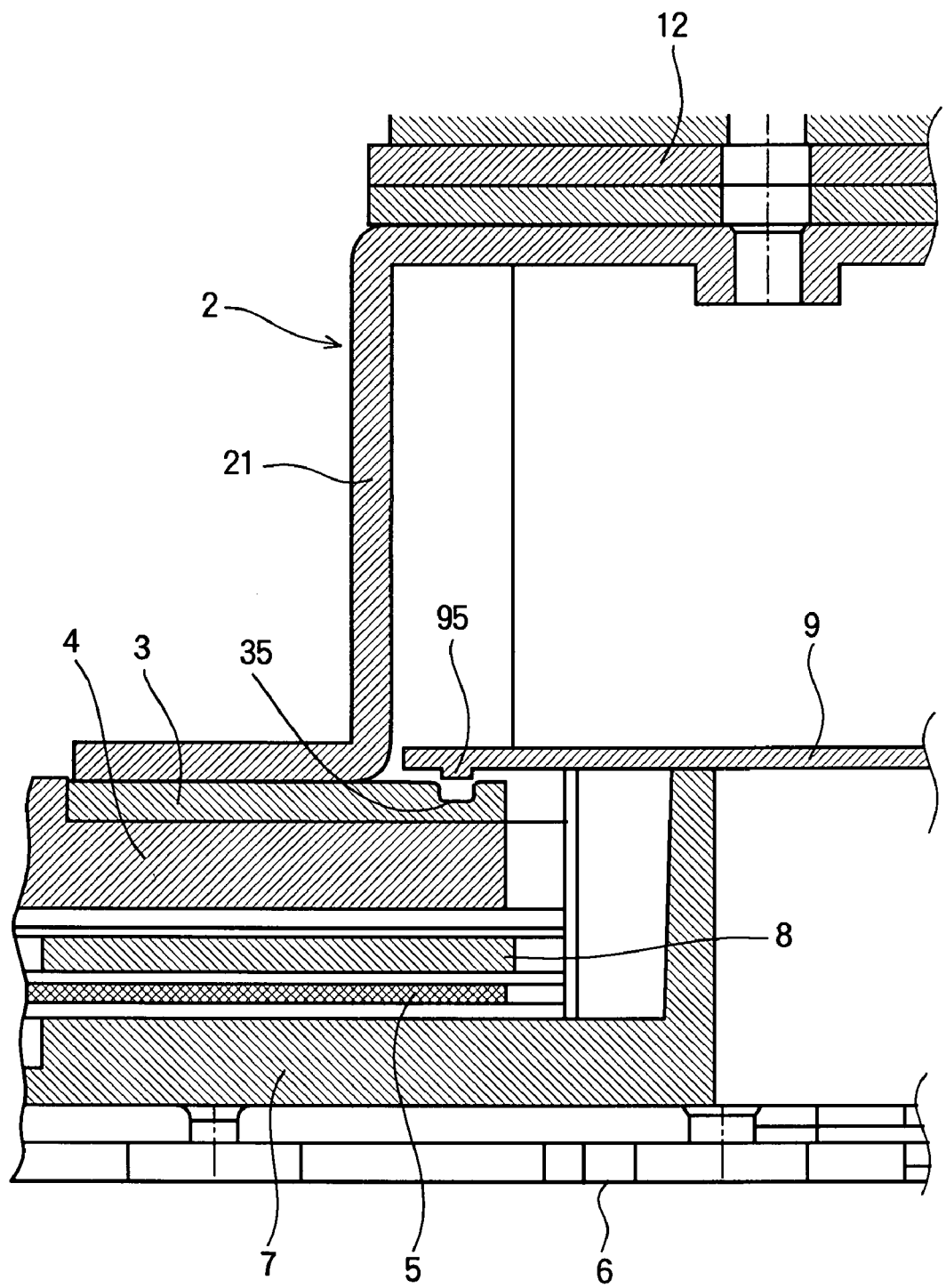
FIG. 10 is an enlarged sectional view showing the main part of a turntable according to Embodiment 3 of the present invention.

FIG. 10 shows a configuration example where concaves 35 are provided on the rotatable base 3 and where protrusions 95 (engaging the concaves 35) are formed on the retaining plate 9. In FIG. 10, components that are the same as those having been described in Embodiment 1 are assigned the same reference numerals.

In the configuration example of FIG. 10, the concaves 35 of the rotatable base 3 and the protrusions 95 of the retaining plate 9 are able to engage each other at predetermined rotational positions. The other configuration is the same as Embodiment 1. In the configuration example of FIG. 10, even if the turntable 200 is going to rotate relative to the display portion 100 while the user carries the display apparatus, the protrusions 95 of the retaining plate 9 engage the concaves 35 of the rotatable base 3, and further rotation of the turntable 200 is prevented. As a result, the turntable 200 is prevented from hitting the user, and the safety of the carriage can be assured.

As described above, even in the case where the concaves 35 are provided on the rotatable base 3 and the protrusions 95 (engaging the concaves 35) are provided on the retaining plate 9, it is possible to lock the rotation of the rotatable plate 200 when the user carries the display apparatus, and the safety of the carriage can be enhanced.

Embodiment 4

In the above described Embodiment 1 (FIG. 3), the retaining plate 9 is provided on the fixed unit 20 side (i.e., the fixed plate 7 side). However, it is also possible to provide the retaining plate 9 on the rotatable unit 10 side (i.e., the rotatable plate 4 side).

Figure 11:
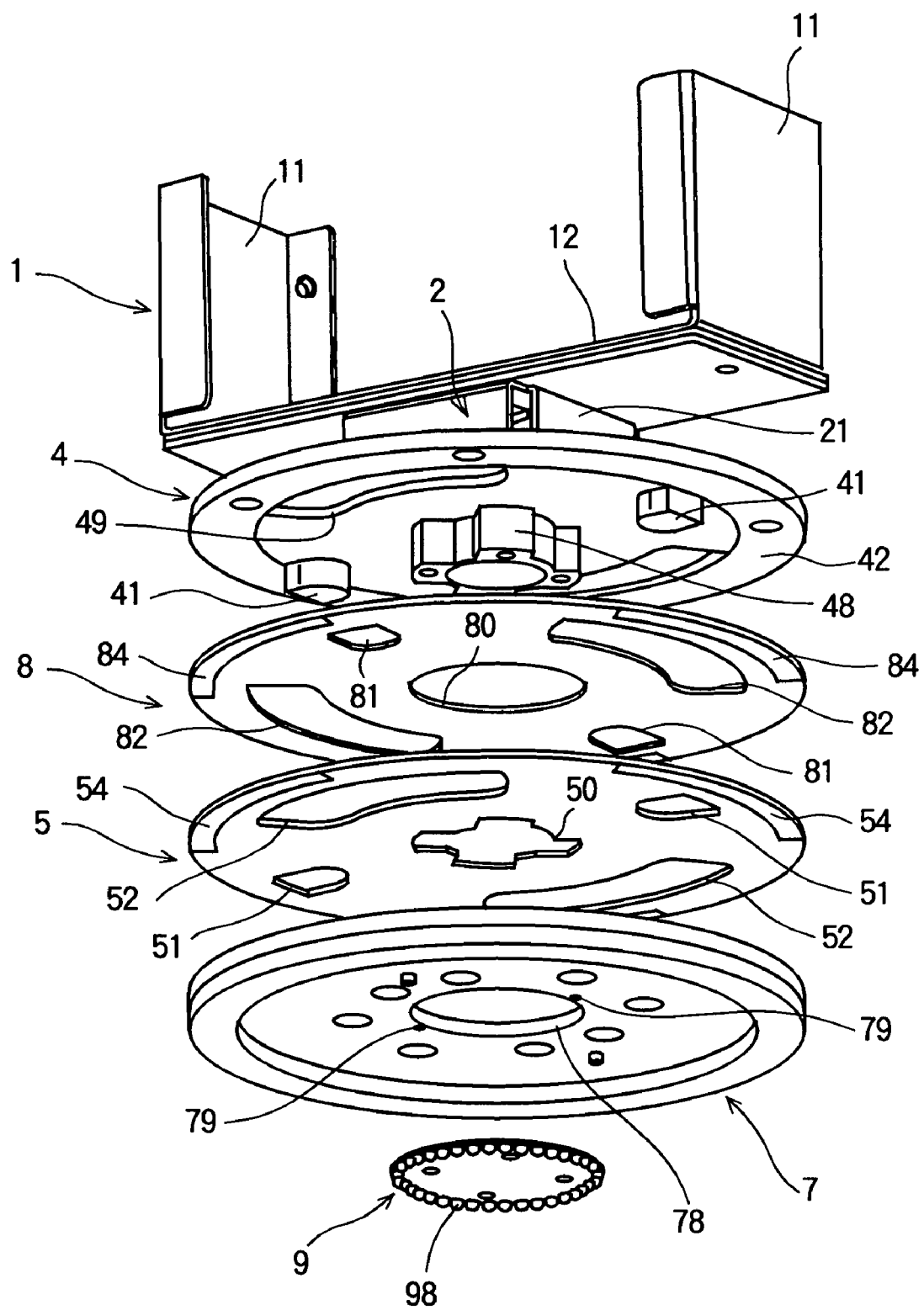
FIG. 11 is an exploded perspective view showing a turntable according to Embodiment 4 of the present invention.

FIG. 11 is an exploded perspective view showing a configuration example where the retaining plate 9 is provided on the rotatable unit 10 side (i.e., the rotatable plate 4 side). In FIG. 11, components that are the same as those having been described in Embodiment 1 are assigned the same reference numerals.

In the configuration example shown in FIG. 11, the rotatable base 3 is not provided, but the neck base 2 is mounted to the rotatable plate 4. Although the center shaft 70 is provided on the fixed plate 7 in Embodiment 1, a center shaft 48 (substantially having cross-shaped section) is provided on the rotatable plate 4 in Embodiment 4. The fixed plate 7 has no center shaft, but has a circular through-hole 78 through which the center shaft 48 penetrates. The opening 50 of the first friction plate 5 is in the shape of a cross so that the center shaft 48 engages the opening 50. The opening 80 of the second friction plate 8 is in the shape of a circle through which the center shaft 48 penetrates.

The retaining plate 9 is fixed to the lower end of the center shaft 48 of the rotatable plate 4. The fixed plate 7, the first friction plate 5 and the second friction plate 8 are held between the retaining plate 9 and the rotatable plate 4. Concaves 98 are formed on the retaining plate 9 by embossing. Protrusions 79 are formed on the fixed plate 7 at positions corresponding to the concaves 98.

When the display portion 100 (FIG. 1) is manually rotated, the first friction plate 5 rotates together with the rotatable plate 4, and the second friction plate 8 (whose rotation is restricted by the fixed plate 7) does not rotate. Therefore, as in Embodiment 1, the friction forces are generated at three portions, i.e., the first sliding contact portion (between the fixed plate 7 and the first friction plate 5), the second sliding contact portion (between the first friction plate 5 and the second friction plate 8), and the third sliding contact portion (between the second friction plate 8 and the rotatable plate 4). Therefore, it becomes possible to obtain a stable friction force which is less influenced by the change of shapes of the respective components. As a result, it becomes possible to reduce the variation in the rotational resistance when the display portion 100 is manually rotated, and it becomes possible to accomplish a stable operation which is less subject to the change with time.

Further, when the turntable 200 is going to rotate relative to the display portion 100 while the user carries the display apparatus, the rotation of the turntable 200 is locked by the engagement between the concaves 98 of the retaining plate 9 and the protrusions 79 of the fixed plate 7, and therefore the safety of the carriage can be enhanced.

As described above, in Embodiment 4, it becomes possible to generate the friction force that hardly influenced by the variation in the shapes of the respective components with time. As a result, the stable rotational resistance with a small variation can be obtained, and the safety of the carriage can be enhanced.

In the above described Embodiments 1 through 4, the manual rotation of the display portion 100 has been described. However, it is also possible to further provide a power transmission mechanism for rotating the display portion 100 using a motor. Moreover, it is also possible to use any combination of the above described Embodiments 2 through 4.

While the preferred embodiments of the present invention have been illustrated in detail, it should be apparent that modifications and improvements may be made to the invention without departing from the spirit and scope of the invention as described in the following claims.

What is claimed is:

1. A turntable comprising:
   a rotatable member rotatable together with a display portion about a predetermined axis line;
   a fixed member disposed on one side of said rotatable member in a direction of said axis line;
   a first friction plate whose rotation about said axis line is restricted by said rotatable member, said first friction plate being movable relative to said rotatable member in a direction along said axis line, and
   a second friction plate whose rotation about said axis line is restricted by said fixed member, said second friction plate being movable relative to said fixed member in a direction along said axis line,
   wherein said first friction plate and said second friction plate are disposed between said fixed member and said rotatable member in a direction of said axis line, and
   wherein, at least, a first sliding contact portion between said fixed member and said first friction plate, a second sliding contact portion between said first friction plate and said second friction plate, and a third sliding contact portion between said second friction plate and said rotatable member are provided, said first, second and third sliding contact portions respectively generating friction.

2. The turntable according to claim 1, wherein at least a part of the weight of said display portion is applied to said sliding contact portion between said fixed member and said first friction plate, said sliding contact portion between said first friction plate and said second friction plate, and said sliding contact portion between said second friction plate and said rotatable member.

3. The turntable according to claim 1, wherein said first friction plate and said second friction plate are disposed between said fixed member and said rotatable member in this order from said fixed plate side.

4. The turntable according to claim 3, wherein said first friction plate has an opening that engages a convex formed on said rotatable member in the direction of said axis line, and
   wherein said second friction plate has a through hole through which said convex of said rotatable member penetrates in the direction of said axis line.

5. The turntable according to claim 3, wherein said second friction plate has an opening that engages a convex formed on said fixed plate in the direction of said axis line, and
   wherein said first friction plate has a through hole through which said convex of said fixed member penetrates in the direction of said axis line.

6. The turntable according to claim 1, further comprising a retaining member that prevents the fixed member, the first friction plate, the second friction plate and the rotatable member from being dropping out of one another,
   wherein said retaining member is fixed to one of said fixed member and said rotatable member, and
   wherein a rotation locking member is provided for locking a rotation of said retaining member relative to the other of said fixed member and said rotatable member.

7. The turntable according to claim 6, wherein said rotation locking member includes:
   a first concave or a first protrusion formed on said retaining member, and
   a second protrusion or a second concave formed on the other of said fixed member and said rotatable member, said second protrusion or said second concave engaging said first concave or said first protrusion.

8. A display apparatus comprising:
   a turntable according to claim 1, and
   said display portion supported by said turntable.

9. The turntable according to claim 1, further comprising a substantially U-shaped mounting base to which said display portion is mounted.

10. The turntable according to claim 9, wherein the mounting base includes a bottom plate and a pair of vertical plates having upper ends and lower ends, wherein said vertical plates engage a predetermined portions of said display portion and said bottom plate connects both lower ends of said vertical plates.

11. The turntable according to claim 10, further comprising a neck base having a top plate and four side plates downwardly bent from four sides of said top plate, wherein said top plate is fixed to said bottom plate of said mounting base.

12. The turntable according to 1, wherein a plurality of first friction plates and a plurality of second friction plates are disposed between said fixed member and said rotatable member in a direction of said axis line.

13. A turntable comprising:
   a rotatable member rotatable together with a display portion about a predetermined axis line;
   a fixed member disposed on one side of said rotatable member in a direction of said axis line;
   a first friction plate whose rotation about said axis line is restricted by said rotatable member, said first friction plate being movable relative to said rotatable member in a direction along said axis line, and
   a second friction plate whose rotation about said axis line is restricted by said fixed member, said second friction plate being movable relative to said fixed member in a direction along said axis line,
   wherein said first friction plate and said second friction plate are disposed between said fixed member and said rotatable member in a direction of said axis line, and
   wherein, at least, a sliding contact portion between said fixed member and said first friction plate, a sliding contact portion between said first friction plate and second friction plate, and a sliding contact portion between said second friction plate and said rotatable member are provided, and
   wherein said first friction plate and said second friction plate are disposed between said fixed member and said rotatable member in this order from said fixed plate side, and
   wherein said first friction plate has an opening that engages a convex formed on said rotatable member in the direction of said axis line, and
   wherein said second friction plate has a through hole through which said convex of said rotatable member penetrates in the direction of said axis line.

14. The turntable according to claim 13, further comprising a substantially U-shaped mounting base to which said display portion is mounted.

15. The turntable according to claim 13, wherein the mounting base includes a bottom plate and a pair of vertical plates having upper ends and lower ends, wherein said vertical plates engage a predetermined portions of said display portion and said bottom plate connects both lower ends of said vertical plates.

16. The turntable according to 14, further comprising a neck base having a top plate and four side plates downwardly bent from four sides of said top plate, wherein said top plate is fixed to said bottom plate of said mounting base.

17. The turntable according to claim 13, further comprising a retaining member that prevents the fixed member, the first friction plate, the second friction plate and the rotatable member from being dropping out of one another,
- wherein said retaining member is fixed to one of said fixed member and said rotatable member, and
- wherein a rotation locking member is provided for locking a rotation of said retaining member relative to the other of said fixed member and said rotatable member.

18. The turntable according to claim 17, wherein said rotation locking member includes:
- a first concave or a first protrusion formed on said retaining member, and
- a second protrusion or a second concave formed on the other of said fixed member and said rotatable member, said second protrusion or said second concave engaging said first concave or said first protrusion.

19. The turntable according to claim 13, wherein a plurality of first friction plates and a plurality of second friction plates are disposed between said fixed member and said rotatable member in a direction of said axis line.

* * * * *